(No Model.)
H. W. KIRCHNER & G. N. CHASE.
MEANS FOR PREVENTING DERAILMENT OF CARS.
No. 508,480. Patented Nov. 14, 1893.
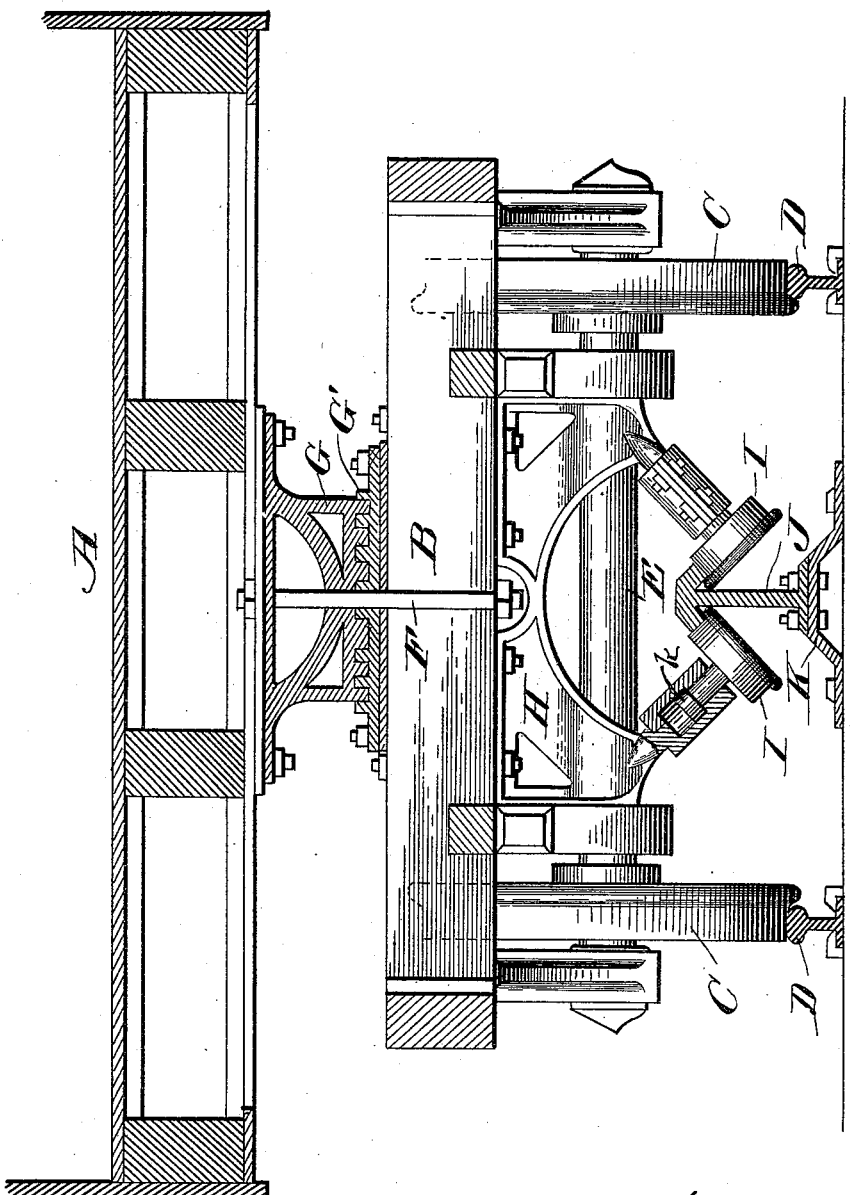
Witnesses
F. R. Cornwall.
A. Ramel.
Inventors
Henry W. Kirchner
George N. Chase
By Paul Bakewell
Atty.
THE NATIONAL LITHOGRAPHING COMPANY,
WASHINGTON, D. C.

UNITED STATES PATENT OFFICE.

HENRY WILLIAM KIRCHNER, OF DENVER, COLORADO, AND GEORGE N. CHASE, OF THE UNITED STATES ARMY.

MEANS FOR PREVENTING DERAILMENT OF CARS.

SPECIFICATION forming part of Letters Patent No. 508,480, dated November 14, 1893.

Application filed November 28, 1892. Serial No. 453,366. (No model.)

*To all whom it may concern:*

Be it known that we, HENRY WILLIAM KIRCHNER, residing at Denver, in the county of Arapahoe and State of Colorado, and GEORGE N. CHASE, residing at Pasadena, in the county of Los Angeles and State of California, (said CHASE of the United States Army,) citizens of the United States, have invented certain new and useful Improvements in Means for Preventing Derailment of Cars, of which the following is a full, clear, and exact description, reference being had to the accompanying drawings, forming a part of this specification, wherein is illustrated an elevational view, partly in section, showing our improved means for preventing the derailment of cars.

Heretofore, in the construction of road-beds for railroads and the laying of tracks thereon, great care has had to be taken to get the proper grading in rounding curves, and, very often, it has been found to be impossible to find such grading on short curves to suit all classes of travel, going at different speeds. The result of this insufficiency is, in many instances, deleterious to the traveling stock, by reason of the fact that there is great susceptibility of the cars jumping the track at such points.

Our invention has for its object the provision of means on the car truck which act as a restraining medium, to prevent the ground wheels from leaving the rails, the result being that the liability of derailment in rounding curves is overcome.

The essential feature of our invention resides in the utilization of a T-rail having obliquely disposed treads located between the tracks, and in providing the truck, in vertical alignment with the king bolt (so that the pivotal or turning point of the truck will be the pivotal or turning point of the restraining wheels), with restraining wheels mounted in a frame hung from the truck, said wheels being placed at an angle so as to have the proper bearing on the obliquely disposed treads of the T-rail and prevent the track wheels from leaving the track. This object we accomplish by the construction illustrated in the accompanying drawings, wherein—

A represents the lower portion of a car body, B, the truck frame, C, the ground wheels, D, the rails, E, the axle, F, the king bolt, G and G', the bearing plates, all of which may be of any ordinary or approved construction.

Suspended from the truck immediately beneath the king-bolt, is a frame H, which is preferably formed so as to embrace the axle E, and form journal-boxes for the stub-shafts of the wheels I. The shafts of these wheels I, are provided with a head $k$, whereby they are not only retained in place, and such construction also leaves a space which permits the introduction of oil thereabove, for purposes readily understood. The boxes are provided with the usual caps or lids, as is most desirable. The wheels I are arranged obliquely, as shown, their treads being adapted to run on the under side of the head of a T-rail J, located centrally between the tracks. This T-rail is provided with the usual base flanges, which are secured by bolts to the crown of a chair K, as shown.

We are aware that many minor changes in the construction and arrangement of the parts of our device may be made and substituted for those herein shown and described, without in the least departing from the nature and principle of our invention.

Having thus described our invention, what we claim, and desire to secure by Letters Patent, is—

1. In combination with a car truck and rails, of a T-rail centrally located between said rails, a crowned chair to which said T-rail is secured, and restraining wheels mounted on the truck at an angle and adapted to bear on the under side of the treads of the T-rail, substantially as and for the purposes described.

2. In combination with a car truck and rails, of a T-rail centrally located between said rails having treads obliquely disposed to its web, and obliquely disposed restraining wheels mounted in bearings on the truck and adapted to bear against the treads of the T-rail, substantially as described.

3. In combination with a car truck and rails, of a T-rail centrally located between the rails and having its treads arranged obliquely to its web, a frame suspended from the truck, restraining wheels journaled in the frame at an angle and adapted to bear against the treads of the T-rail, said restraining wheels being mounted in the frame immediately beneath the pivot point of the truck, substantially as described.

In testimony whereof we hereunto affix our signatures, in presence of two witnesses, this 19th day of November, 1892.

H. WILLIAM KIRCHNER.
   GEORGE N. CHASE.

Witnesses:
 D. I. EZEKIEL,
 HUGH K. WAGNER.